(12) United States Patent
Veldhuisen

(10) Patent No.: US 6,480,850 B1
(45) Date of Patent: *Nov. 12, 2002

(54) SYSTEM AND METHOD FOR MANAGING DATA PRIVACY IN A DATABASE MANAGEMENT SYSTEM INCLUDING A DEPENDENTLY CONNECTED PRIVACY DATA MART

(75) Inventor: Adriaan W. Veldhuisen, San Marcos, CA (US)

(73) Assignee: NCR Corporation, Dayton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/411,337

(22) Filed: Oct. 1, 1999

Related U.S. Application Data (63) Continuation-in-part of application No. 09/165,784, filed on Oct. 2, 1998, now Pat. No. 6,253,203.

(51) Int. Cl.$^7$ ............................................... G06F 17/30
(52) U.S. Cl. ................................ 707/9; 707/2; 707/201
(58) Field of Search ........................... 707/1, 2–5, 7–9, 707/10, 100–102, 500, 526–527, 200–206; 705/35–37, 38; 713/200–202; 709/217–219

(56) References Cited

U.S. PATENT DOCUMENTS

| | | | | |
|---|---|---|---|---|
| 5,319,777 A | * | 6/1994 | Perez ............................ | 707/1 |
| 5,751,949 A | * | 5/1998 | Thomson et al. ........... | 713/201 |
| 5,961,593 A | * | 10/1999 | Gabber et al. .............. | 709/219 |
| 6,085,191 A | * | 7/2000 | Fisher et al. ................. | 707/9 |
| 6,141,658 A | * | 10/2000 | Mehr et al. .................. | 707/7 |
| 6,195,657 B1 | * | 2/2001 | Rucker et al. ................ | 707/5 |
| 6,253,203 B1 | * | 6/2001 | O'Flaherty et al. ........... | 707/9 |
| 6,275,824 B1 | * | 8/2001 | O'Flaherty et al. ........... | 707/9 |

* cited by examiner

*Primary Examiner*—Alford W. Kindred
(74) *Attorney, Agent, or Firm*—James M. Stover (57) ABSTRACT

A system for managing data privacy comprises a database management system for storing data from a plurality of consumer database tables, with irrevocable logging of all access, whether granted or denied, to the data contents stored in the consumer data tables; a privacy metadata system that administers and records all data, users and usage of data that is registered as containing privacy elements; and a replication system that feeds the consumer access system with personal consumer data, maintains integrity of the consumer data and provides changes and corrections back to the originating database management system through their own integrity filters as well as a means of storage and the mechanism to provide input for changes in the personal data or privacy preferences. The system further includes means for managing consumer notification, access, correction and change of preferences for privacy or data protection in the privacy metadata system.

6 Claims, 11 Drawing Sheets

SYSTEM AND METHOD FOR MANAGING DATA PRIVACY IN A DATABASE MANAGEMENT SYSTEM INCLUDING A DEPENDENTLY CONNECTED PRIVACY DATA MART

This is a continuation-in-part of application Ser. No. 09/165,784, entitled "PRIVACY-ENHANCED DATABASE," by Kenneth W. O'Flaherty, Richard G. Stellwagen, Jr., Todd A. Walter, Reid M. Watts, David A. Ramsey, Adriaan W. Veldhuisen, Renda K. Ozden, and Patrick B. Dempster filed on Oct. 2, 1998, now U.S. Pat. No. 6,253,203.

CROSS-REFERENCE TO RELATED APPLICATIONS

This application is related to the following co-pending and commonly assigned applications, each of which is hereby incorporated by reference herein:

U.S. patent application Ser. No. 09/165,457, entitled "PRIVACY-ENABLED LOYALTY CARD SYSTEM AND METHOD," by Kenneth W. O'Flaherty, Reid M. Watts, and David A. Ramsey, filed on Oct. 2, 1998; and U.S. patent application Ser. No. 09/165,777 U.S. Pat. No. 6,275,824, entitled; "SYSTEM AND METHOD FOR MANAGING DATA PRIVACY IN A DATABASE MANAGEMENT SYSTEM," by Kenneth W. O'Flaherty, Richard G. Stellwagen, Jr., Todd A. Walter, Reid M. Watts, David A. Ramsey, Adriaan W. Veldhuisen, Renda K. Ozden, and Patrick B. Dempster filed on Oct. 2, 1998; and U.S. Provisional Patent Application Serial No. 60/102,832, entitled "SYSTEM AND METHOD FOR PRIVACY ENHANCED DATA WAREHOUSING," by Kenneth W. O'Flaherty, Richard G. Stellwagen, Jr., Todd A. Walter, Reid M. Watts, David A. Ramsey, Adriaan W. Veldhuisen, Renda K. Ozden, and Patrick B. Dempster filed on Oct. 2, 1998.

BACKGROUND OF THE INVENTION

1. Field of the Invention

The present invention relates to systems and methods of data warehousing and analysis, and in particular to a system and method for providing consumer notification, access, data correction and change of preferences for data privacy in a data warehousing system that includes a physically separate but dependently connected data mart.

2. Description of the Related Art

Database management systems are used to collect, store, disseminate, and analyze data. These large-scale integrated database management systems provide an efficient, consistent, and secure data warehousing capability for storing, retrieving, and analyzing vast amounts of data. Meta Data Services are a comprehensive solution for managing metadata in complex data warehouse environments. Meta Data Services provides a solution for locating, consolidating, managing and navigating warehouse metadata. It also allows for setting aside an area from where all system aspects of privacy are registered, administered and logged in an auditable format. The ability to collect, analyze, and manage massive amounts of information through metadata has become a virtual necessity in business today, particularly when multiple hardware systems are involved.

The information stored by these data warehouses can come from a variety of sources. One important data warehousing application involves the collection and analysis of information collected in the course of commercial transactions between retailer outlets and retail consumers. For example, when an individual uses a credit card to purchase an item at a retail store, the identity of the customer, the item purchased, the purchase amount and other similar information are collected. Traditionally, this information is used by the retailer to determine if the transaction should be completed, and to control product inventory. Such data can also be used to determine temporal and geographical purchasing trends.

The data collected during such transactions is also useful in other applications. For example, information regarding a particular transaction can be correlated to personal information about the consumer (age, occupation, residential area, income, etc.) to generate statistical information. In some cases, this personal information can be broadly classified into two groups: information that reveals the identity of the consumer, and information that does not. Information that does not reveal the identity of the consumer is useful because it can be used to generate information about the purchasing proclivities of consumers with similar personal characteristics. Personal information that reveals the identity of the consumer can be used for a more focused and personalized marketing approach in which the purchasing habits of each individual consumer differentiates the approach and brings competitive advantage.

Unfortunately, while the collection and analysis of such data can be of great public benefit, it can also be the subject of considerable abuse. It can discourage the use of emerging technology, such as cash cards and loyalty card programs, and foster continuation of more conservative payment methods such as cash and checks. In fact, public concern over privacy is believed to be a factor holding back the anticipated explosive growth in web commerce.

For all of these reasons, when personal information is stored in data warehouses, it is incumbent on those that process and control this data to protect the data subjects from such abuse. As more and more data is collected in this, the computer age, the rights of individuals regarding the use of data pertaining to them have become of greater importance. What is needed is a system and method which provides all the advantages of a complete data warehousing system, while addressing the privacy concerns of the consumer. Consumers should have insight in what data about them is subject to collection and use.

Therefore, it is the responsibility of those that process and control personal data to provide accurate and full disclosure of what data is collected and processed, for what purposes, and under what limits of use. This includes data which the data controller has not collected directly from the consumer. It is the obligation of a data controller to provide access to the consumer of data which are being processed, in order to notify the consumer of the existence of a processing operation and, where data are collected from him, accurate and full information to verify in particular the accuracy of the data and the implied or explicitly stated preferences of privacy or data protection that has been agreed between the data controller and the data subject and work directly with the consumer to negotiate privacy preferences.

SUMMARY OF THE INVENTION

To address the requirements described above, the present invention discloses a method and apparatus for managing consumer notification and access and a means of correction and change of preferences for privacy or data protection in a data warehousing system including a physically separate but dependently connected data mart.

The apparatus comprises a database management system, for storing data from a plurality of consumer database tables, with irrevocable logging of all access, whether granted or denied, to the data contents stored in the consumer data tables, a privacy metadata system that administers and records all data, users and usage of data that is registered as containing privacy elements, a replication system that feeds the consumer access system with personal consumer data, maintains integrity of the consumer data and provides changes and corrections back to the originating database management system through their own integrity filters as well as a means of storage and the mechanism to provide input for changes in the personal data or privacy preferences.

The method is supported by a privacy administrators utility and includes procedures for migration of consumer data from any state or format into a consistent and presentable state in the consumer access dependent data mart by establishing a database logical data model and physical database design in the data mart with all the tables, views and macros needed to reflect all aspects of personal data and its identifiers, dependently coupled for integrity to the base consumer database management system as a direct reflection of the tables in that system, extending database tables to store and retrieve privacy preference parameters for the data stored in the database table, the privacy parameters collectively reflected in a plurality of database views associated with the data, accepting personal data and privacy parameters from the data source, possibly including sources external to the data warehouse, storing the privacy parameters in the columns associated with the data, providing notification of and access to the data in the database table to a requesting consumer solely through a privacy metadata services interface in accordance with the personal privacy parameters.

Where possible the data models will be adapted to accepted privacy standards, like P3P, to reflect the data types and privacy sensitivity levels necessary and the consumer privacy preferences, provide for an adapted system for loading, formatting and maintaining data through Teradata utilities provide a system for returning changes back to the source system and a utility that allows a privacy administrator or data protection officer to manage the consumer access system to legal specifications. The program storage device comprises a medium for storing instructions performing the method steps outlined above.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
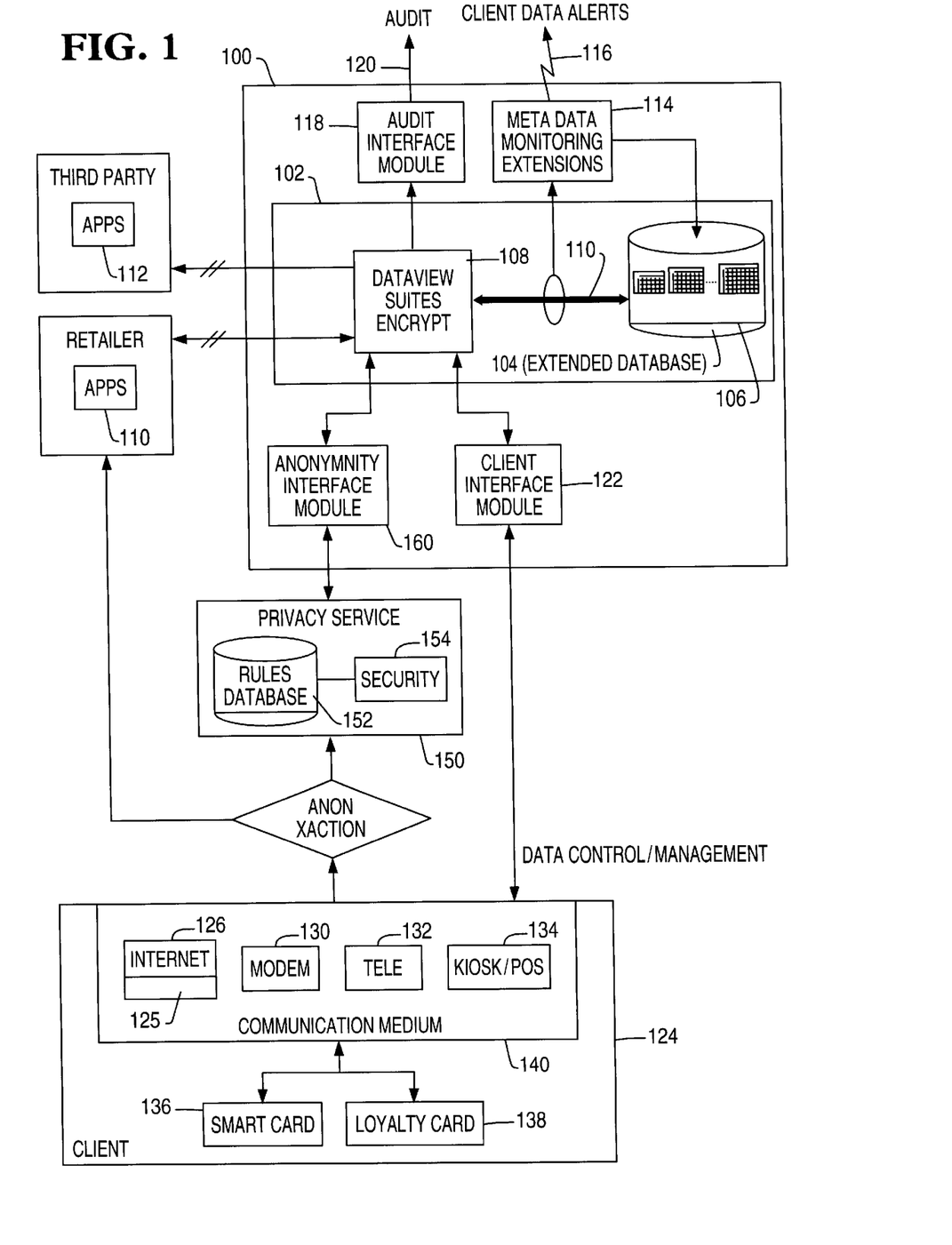
FIG. 1 is a system block diagram of an exemplary embodiment of a data warehouse system.

FIG. 1 is a system block diagram presenting an overview of a data warehousing system 100. The system comprises secure data warehouse 102 having a database management system 104 storing one or more extended databases 106 therein.

One important capability of a database management system is the ability to define virtual table and save that definition in the database as metadata with a user-defined name. The object formed by this operation is known as a dataview. As a virtual table, a dataview is not physically materialized anywhere in the database until it is needed. All accesses to data, other than for data administrative purposes, would be accomplished through dataviews. Various dataviews exist for purposes of implementing privacy rules. Metadata about the privacy dataview (including the dataview name, names and data types of the dataview columns, and the method by which the rows are to be derived) is stored persistently in the databases metadata, but the actual data presented by the view is not physically stored anywhere in association with the derived table. Instead, the data itself is stored in a persistent base table, and the view's rows are derived from that base table. Although the dataview is a virtual table, operations can be performed against dataviews just as they can be performed against the base tables.

The secure data warehouse 102 further comprises a suite of privacy metadata dataviews 108 through which all data in the extended database 106 are presented. Data within the extended database 106 can be viewed, processed, or altered only through the dataviews in this suite. The schema and logical model of the extended database and dataviews is set forth more fully herein with respect to FIG. 2.

Virtually all access to the data stored in the extended database 106 is provided solely through the dataview suite 108. Thus, retailer applications 110 and third party applications 112 have access only to such data as permitted by the database view provided. In one embodiment, provision is made to permit override of the customer's privacy preferences. However, in such circumstances, data describing the nature of the override is written to the database for retrieval by the audit module 118, so that the override cannot occur surreptitiously. Further, overrides may be monitored by the privacy metadata monitoring extensions 114 to provide an alert to the consumer when such overrides occur 116.

The limiting access to the data stored in the extended database 106 to access provided by the privacy dataview suite 108 for purposes of implementing privacy rules provides the capability to make the personal data anonymous (through the anonymizing view described herein), to restrict access to opted-out columns, which can apply to all personal data, separate categories of personal data, or individual data columns, and to exclude entire rows (customer records) for opted-out purposes—a row is excluded if any of the applicable opt-out flags is on for the customer in question.

Using a client interface module 122 that communicates with the dataviews 108, a client 124 can access, control, and manage the data collected from the client 124. This data control and management can be accomplished using a wide variety of communication media 140, including the Internet 126 (via a suitable browser plug-in 125, a modem 130, voice telephone communications 132, or a kiosk 134 or other device at the point of sale. To facilitate such communications, the kiosk or other device at the point of sale, can issue a smartcard 136 or a loyalty card 138. The kiosk/pos device 134 can accept consumer input regarding privacy preferences, and issue a smartcard 136 or loyalty card 138 storing information regarding these preferences. Similarly, when using the kiosk/pos device 134 and the smartcard 136 or loyalty card 138, the consumer may update or change preferences as desired. In cases where the loyalty card 138 is a simple read only device (such as a bar-coded attachment to a key ring), the kiosk/pos device 134 can accept issue replacement cards with the updated information as necessary. Transactions using the loyalty card 138 or smartcard 136 are selectably encrypted. Either card may interact directly with the server or through a plug-in to implement the security rules selected.

Through this interface, the consumer can specify data sharing and retention preferences. These allow the consumer to specify when and under what circumstances personal information may be retained or shared with others. For example, the consumer may permit such data retention as a part of a loyalty card program, or specify that use of the data is limited to particular uses. Further, the consumer may specify under what circumstances the data may be sold outright, used for statistical analysis purposes, or used for elective marketing programs.

The data warehousing system 100 also permits use of anonymous data within the data warehouse 102 via a privacy service 150. When the user desires anonymous data, the transaction is routed to the privacy service 150. The privacy service 150 accesses a privacy rule database 152 and other security information 154 and uses the privacy rule and security information to remove all information from which the identity of the consumer can be determined. The cleansed transaction information response is then forwarded to the anonymity protection interface module 160 in the secure data warehouse. Communications with the secure data warehouse 102 use a proxy user identification, which is created by the privacy service 150 from the customer's username or other identifying information. If the customer does not require anonymous data, the transaction is provided directly to the retailer who may store the transaction information response in the extended database.

Since it alone provides access to data within the extended database, the dataview suite 108 also provides a convenient and comprehensive means for auditing the security of the secure data warehouse 102.

The secure data warehouse 102 also comprises metadata monitoring extension 114. This extension 114 allows the customer to generate a rule to monitor the use of personal data, and to transmit an alert 116 or callback if a metadata definition change occurs. The customer can control the metadata monitoring extension 114 to trigger an alert when the consumer's personal information is read from the extended database 106, when personal information is written to the extended database 106, when opt-out delimiters stored in the extended database are changed, or when a table or a dataview is accessed. The metadata monitoring extension 114 also records data source information, so customers can determine the source of the data stored in the secure data warehouse 102. The data source may be the customer, or may be a third party intermediary source. This feature is particularly useful when the consumer would like to not only correct erroneous information, but to determine the source of the erroneous information so the error will not be replicated in the same database or elsewhere.

The metadata monitoring extension 114 can also be used to support auditing functions by tracking reads or writes from the extended database 106 as well as the changes to the dataview suite 108.

The described system can be implemented in a computer comprising a processor and a memory, such as a random access memory (RAM). Such computer is typically operatively coupled to a display, which presents images such as windows to the user on a graphical user interface. The computer may be coupled to other devices, such as a keyboard, a mouse device, a printer, etc. Of course, those skilled in the art will recognize that any combination of the above components, or any number of different components, peripherals, and other devices, may be used with the computer.

Generally, the computer operates under control of an operating system stored in the memory, and interfaces with the user to accept inputs and commands and to present results through a graphical user interface (GUI) module. Although the GUI module is typically a separate module, the instructions performing the GUI functions can be resident or distributed in the operating system, an application program, or implemented with special purpose memory and processors. The computer may also implement a compiler that allows an application program written in a programming language such as COBOL, C++, FORTRAN, or other language to be translated into processor-readable code. After completion, the application accesses and manipulates data stored in the memory of the computer using the relationships and logic that was generated using the compiler.

In one embodiment, instructions implementing the operating system, the computer program, and the compiler are tangibly embodied in a computer-readable medium, e.g., data storage device 170, which could include one or more fixed or removable data storage devices, such as a zip drive, floppy disc drive, hard drive, CD-ROM drive, tape drive, etc. Further, the operating system and the computer program are comprised of instructions which, when read and executed by the computer, causes the computer to perform the steps necessary to implement and/or use the present invention. Computer program and/or operating instructions may also be tangibly embodied in memory and/or data communications devices, thereby making a computer program product or article of manufacture according to the invention. As such, the terms "program storage device," "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Figure 2A:
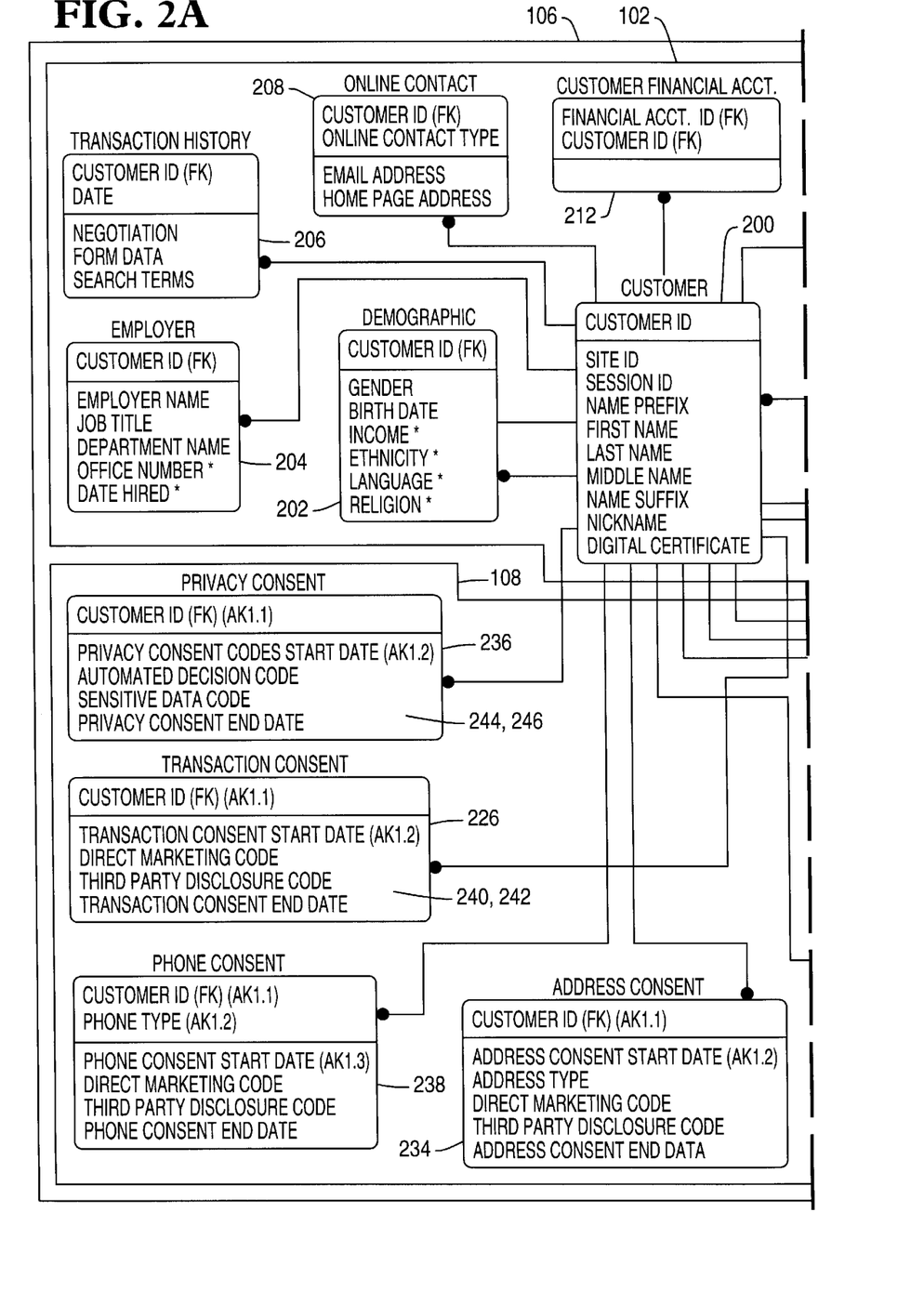
FIGS. 2A and 2B illustrate a graphical representation of the privacy logical data model that supports the implementation of both the data warehouse and a dependent data mart.
Figure 2B:
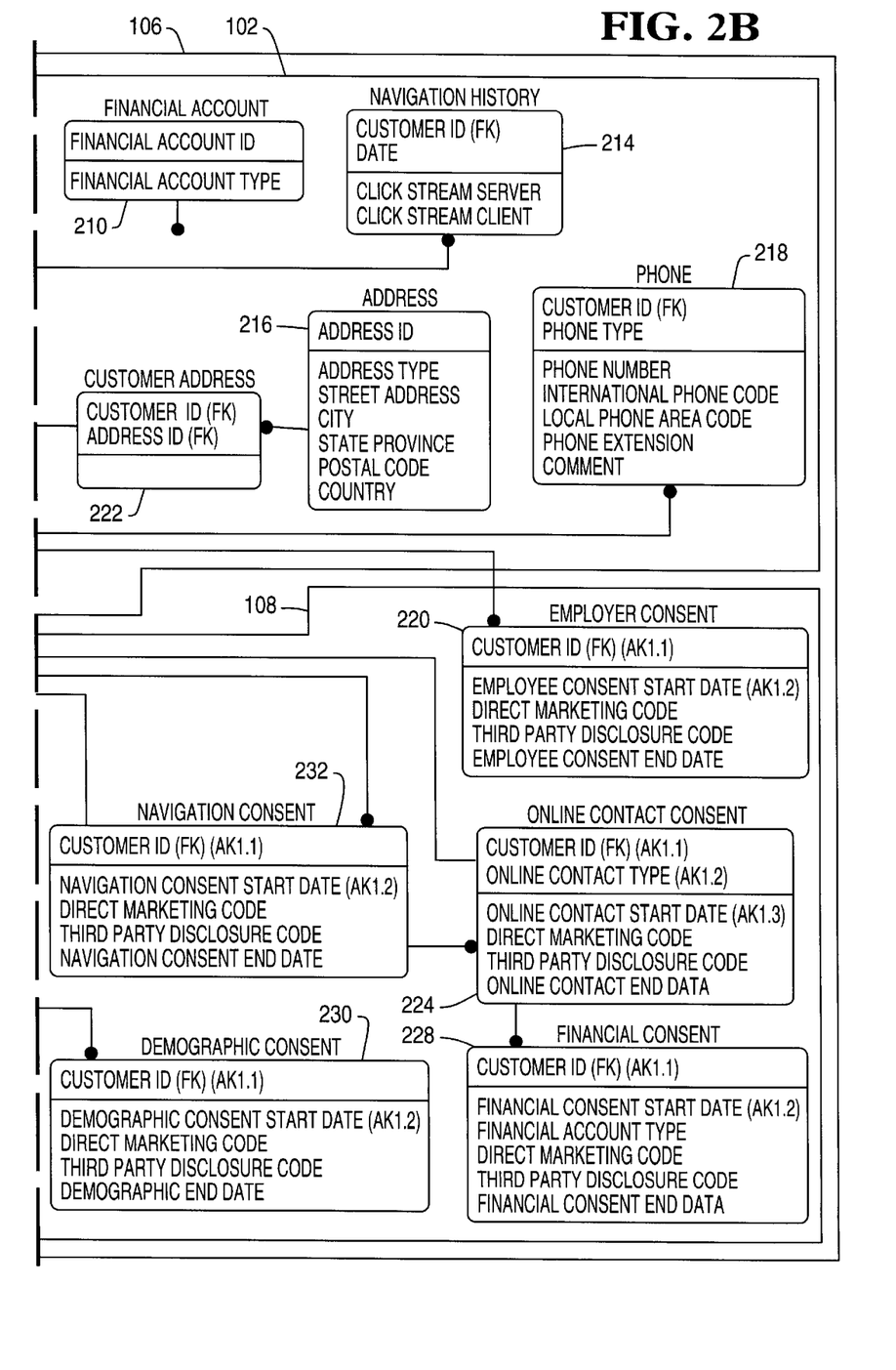

FIGS. 2A and 2B provide a diagram showing the logical model of the secure data warehouse 102 and the dataview suite 108 in greater detail. The extended database 106 comprises a customer table 200, which is segmented into categories of personal data: such as phone 218, address 216, demographic 202, employer 204, financial account 210, navigation history 214, transaction history 206, and online contact 208. Each personal data category also has an associated consent table: such as phone consent 238, address consent 234, demographic consent 230, employer consent 220, financial consent 228, navigation consent 232, transaction consent 226, and online contact consent 224. The consent tables specify data reflecting the privacy preferences, or "opt-outs", for the accompanying data. In the disclosed embodiment, these privacy preferences include "opt-outs" for (1) direct marketing 240, (2) disclosure of personal data along with information identifying the consumer 242, (3) anonymous disclosure of personal data 242, (4) disclosure of personal data for purposes of making automated decisions 244, and (5) disclosure or use of sensitive data 246. Start and end dates are also maintained within the consent tables for historical tracking of consumer consent options.

In the logical data model, the individual consent tables allow very fine-grained selection by the consumer of privacy preferences. For example, the consumer could opt-in to third party disclosure of her phone number, but opt-out to third party disclosure of her address. The model also allows privacy preferences that apply across the entire consumer record, store in the privacy consent codes table 236. The automated decision code 244 allows consumers to indicate whether their data could be used to perform automated processing. The sensitive data code 246 allows consumers to permit dissemination of sensitive data.

In one embodiment, an NCR Corporation TERADATA database management system is utilized to implement the foregoing logical model. This implementation has several advantages.

First, the TERADATA database management system's ability to store and handle large amounts of data eases the construction of the many different views and allows the secure data warehousing system 100 to utilize a logical data model is in or close to the third normal form.

Second, unlike systems which execute SQL queries as a series of selections to narrow the data down to the dataview subset, the TERADATA database management system rewrites dataview-based queries to generate the SQL that selects the necessary columns directly from the appropriate base tables. While other views materialize entire tables before narrowing down the data to the view subset, TERADATA generates SQL that selectively pulls appropriate columns and rows into the result table. This method is a particularly advantageous in implementing the foregoing logical model.

Third, the foregoing logical model generally results in dataviews, which include complex queries and wide SQL expressions. The TERADATA database management system is particularly effective at optimizing such queries and SQL expressions.

Figure 3:
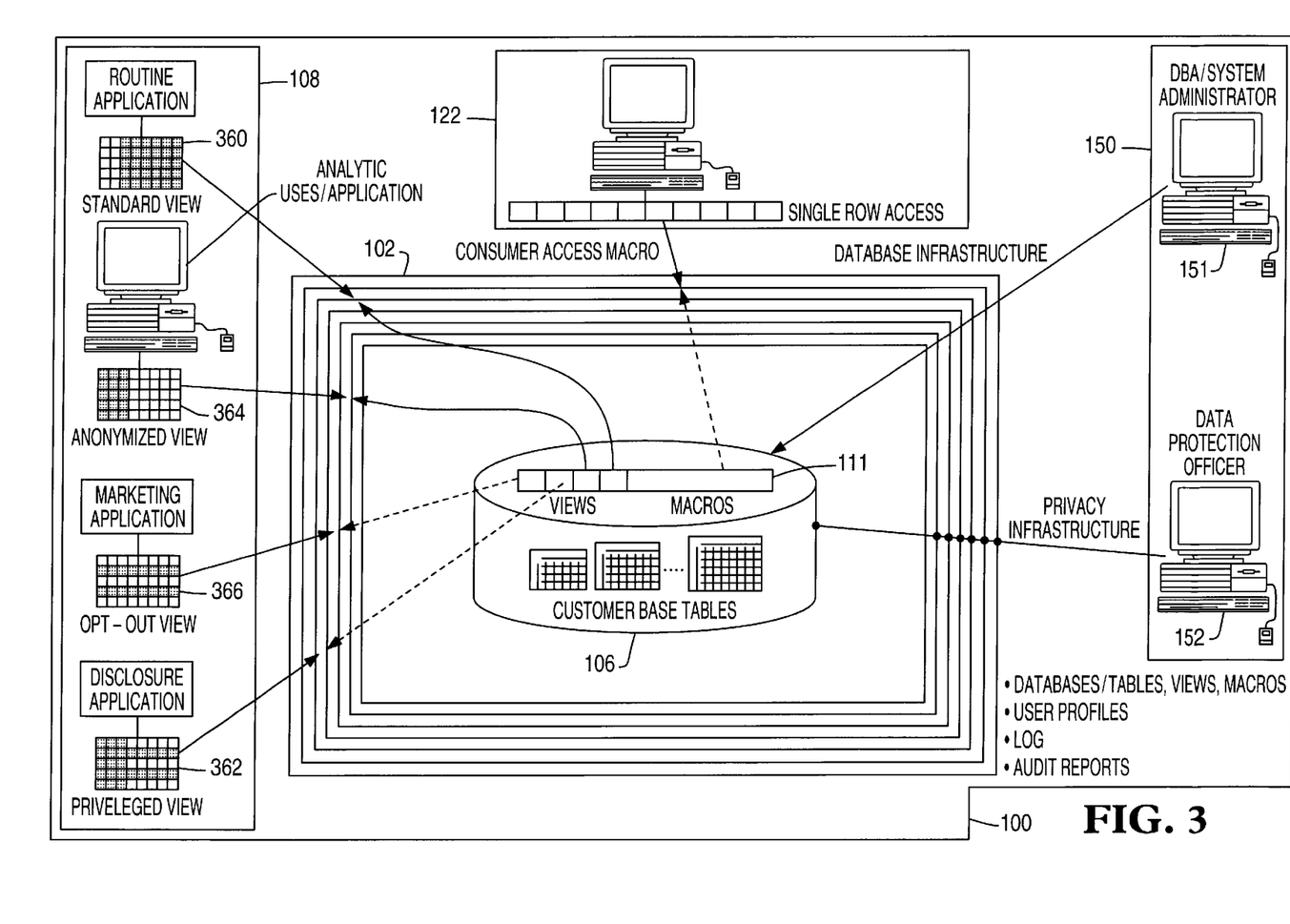
FIG. 3 is a block diagram presenting an illustrative example of the structure of privacy-extended customer tables stored in the data management system and the database views that provide virtual separation between different user types and the actual data.

FIG. 3 illustrates a number of dataviews that are provided in the dataview suite 108. These dataviews include a standard view 360, a privileged view 362, an anonymizing view 364, and an opt-out view 366. These views limit visibility into the data in the customer table 106 in accordance with the values placed in the data control columns.

The standard view 360 will not present personal data unless either the flag in column (indicating that the personal information and identifying information can be disseminated or indicating that personal information can only be disseminated anonymously) is activated. Hence, the standard view 360 selectively masks personal data from view unless the consumer has set the appropriate flags to the proper value.

Scaleable data warehouse (SDW) customer Data Base Administrator's (DBA) 151 set up views into customer tables (any tables containing personal information about their customers), controlled by the Data Protection Offices 152, such that, for routine users, all columns of personal information are hidden.

The client interface module 122, which is used to view, specify, and change consumer privacy preferences, is a privileged application. Appropriate security measures are undertaken to assure that the privileged applications are.suitably identified as such, and to a prevent privileged view access by any entity that is not so authorized.

Certain SDW applications ("Class B") may perform analysis on personal data, in order to gain insight into customer behavior, e.g. to identify trends or patterns. Such applications may be driven by end-users (knowledge workers or "power analysts") performing "ad hoc" queries, typically using either custom-built software or standard query or OLAP Tools, where the end-user spots the patterns. They may also involve the use of data mining tools, where statistical or machine learning algorithms, in conjunction with the analyst, discover patterns and from them build predictive models.

Figure 4A:
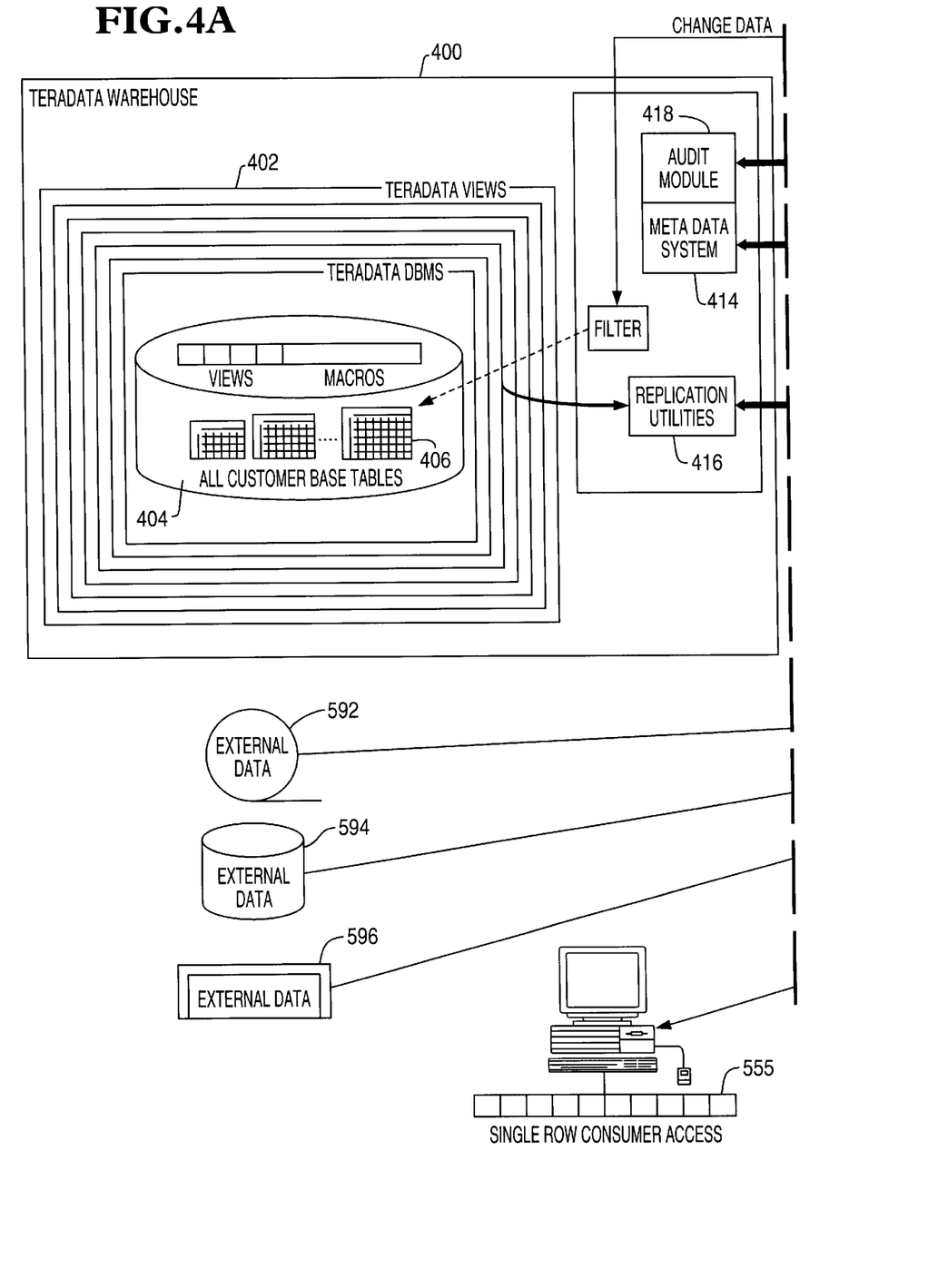
FIGS. 4A and 4B illustrate a data warehouse with a physically separate but dependently connected, privacy dependent data mart and the functions associated with the data mart.
Figure 4B:
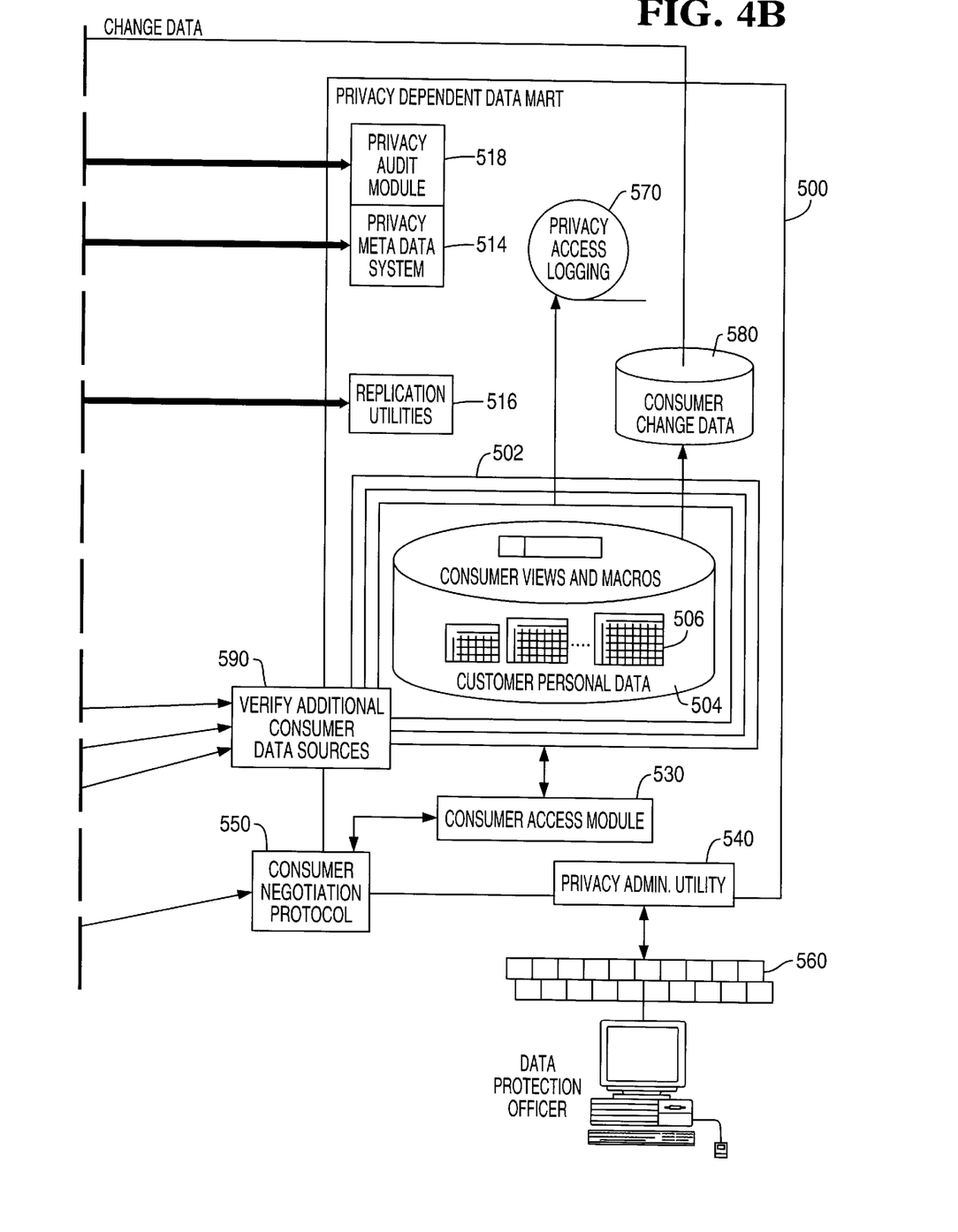

FIGS. 4A and 4B illustrate a data warehouse 400 with a physically separate but dependently connected, privacy dependent data mart 500 and the functions associated with the data mart. The data warehouse includes a data base management system 404 storing one or more database tables 406 containing personal data 406. Communication between the data warehouse 400 and the privacy dependent data mart is provided through audit 418, metadata system 414, and replication 416 modules contained within data warehouse 400 and corresponding privacy audit 518, privacy metadata system 514, and replication 516 modules contained within privacy dependent data mart 500. In this embodiment, each class of functionality is applied separately to the data (e.g. filtering the change data), including specific control functions (e.g. providing audit reports or replicating data). For example, the data warehouse 400 contains the only version of all consumer information, all changes to the structure and use are fully audited and all input to the data contents or consumer preferences are filtered and limited for integrity. These limitations can be selected by entering the proper combination of integrity and preference. The present invention permits the expansion of the above described privacy preference paradigm to a similar system of multiple functions of consumer information and preferences, based upon the same detail of customer preferences.

In the privacy dependent data mart embodiment, the security and privacy protection features of the extended database are further enhanced with the use of privacy access logging 570 that captures all access attempts to the customer data, whether granted or denied, and the consumer change data 580 as provided by the customer that examines their own data and preferences. This may be used by the system on-line or in batch mode to feed the authorized changes back to the source database through integrity filters.

In one embodiment, external data in various formats 592, 594 and 596 might be allowed to enrich the consumer data 590 through an additional privacy data source filter, and selectively applied to the consumer personal data. This technique allows external customers data to be automatically flagged (e.g. for authentication purposes), but could allow for exclusion of processing for return of change data back to the data warehouse.

Figure 5:
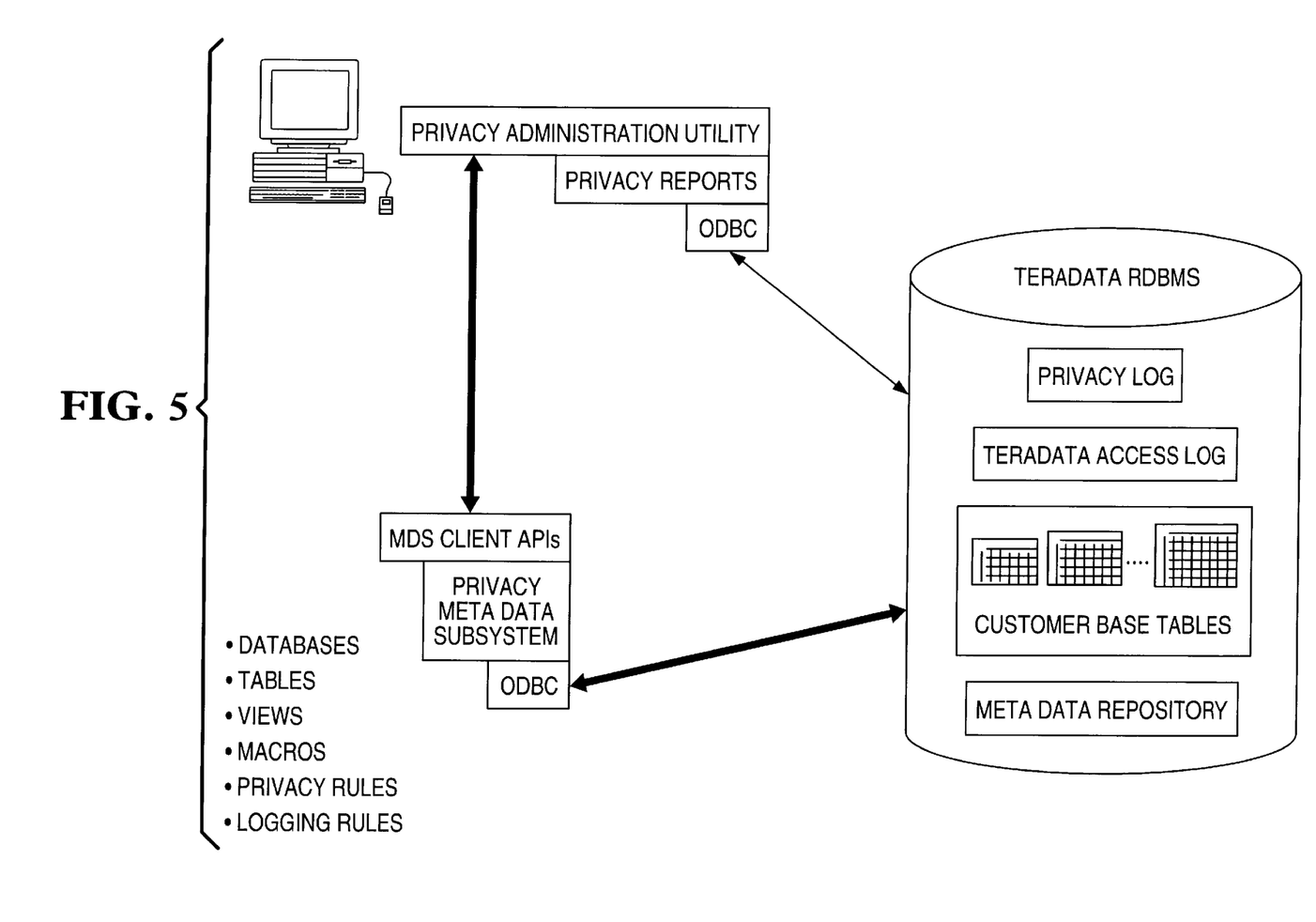
FIG. 5 is a block diagram illustrating the functions of the privacy administration utility that supports the privacy dependent data mart.

FIG. 5 is a block diagram illustrating the functions of the privacy administration utility 540 that supports the privacy dependent data mart.

Figure 6:
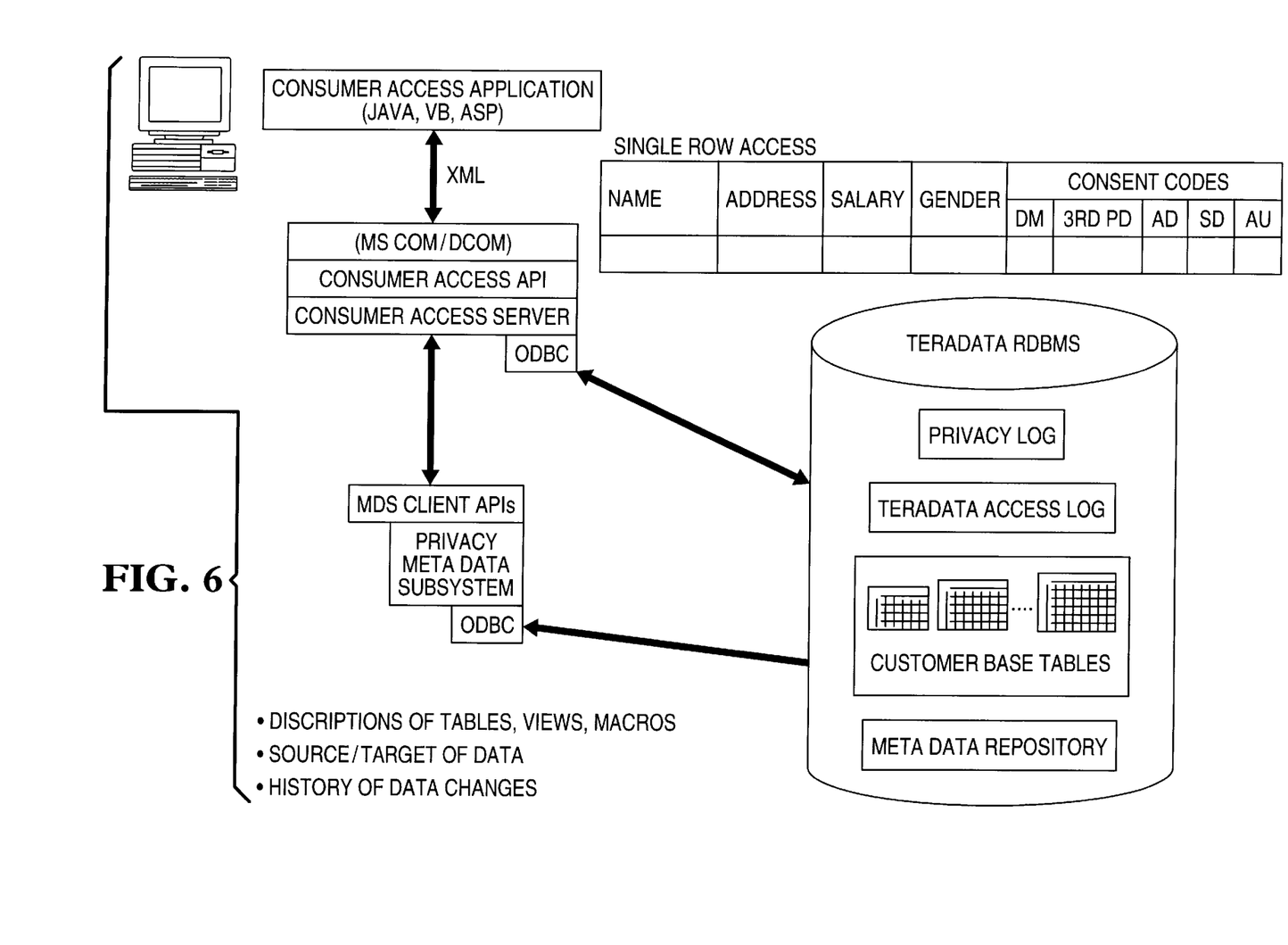
FIG. 6 is a block diagrams illustrating the functions of the privacy consumer access module and utility that supports the privacy dependent data mart.

FIG. 6 is a block diagram illustrating the functions of the privacy consumer access module 530 that supports the privacy dependent data mart.

Figure 7:
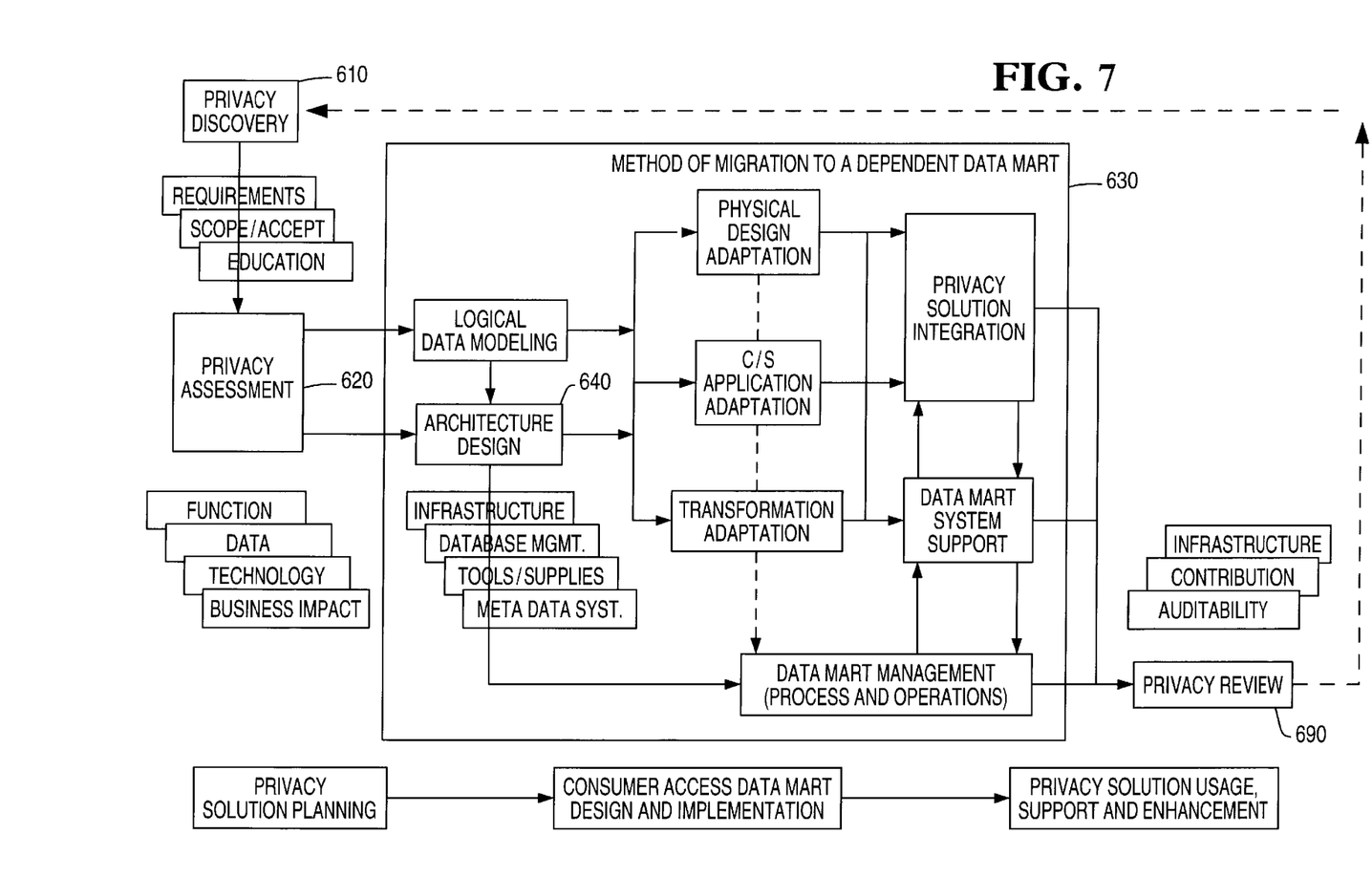
FIG. 7 is a flow chart illustrating the total methodology for building privacy into a data warehouse or a data mart consisting of a Privacy Planning phase, a Design & Implementation phase and a Privacy Usage, Support & Enhancement phase.

FIG. 7 is a flow chart illustrating the total methodology for building privacy into a data warehouse or a data mart consisting of a Solution Planning phase, a Design and Implementation phase and a Solution Usage, Support and Enhancement phase. The functions of the Privacy Discovery service 610 are to provide education, determine the business requirements, and set the scope to be accepted by the business. Privacy Assessment service 620 is based on the outcome of Privacy Discovery and executes a GAP analysis against the functional, data, and technical requirements for Privacy and uses these evaluations as input for the Business Impact Assessment which quantifies the impact that implementation choices will bring to the current business in terms of investment and revenue opportunity, positive or negative. Privacy Assessment also creates an implementation blueprint of the changes needed in infrastructure and business practices to enable a data warehouse for Privacy. This blueprint feeds into the Architecture Design 640 that lays the foundation for choices for change in Infrastructure, Database Management, Tools and Utilities all built around an integrated Metadata system. After completion of an implementation of Privacy in a data warehouse environment a Privacy Review 690 is recommended to evaluate whether the implementation goals for infrastructure change has been met and what Data Warehouse Contributions have been achieved. This service also prepares for auditability by EDP Auditors or Privacy or Data Protection regulators.

Figure 8A:
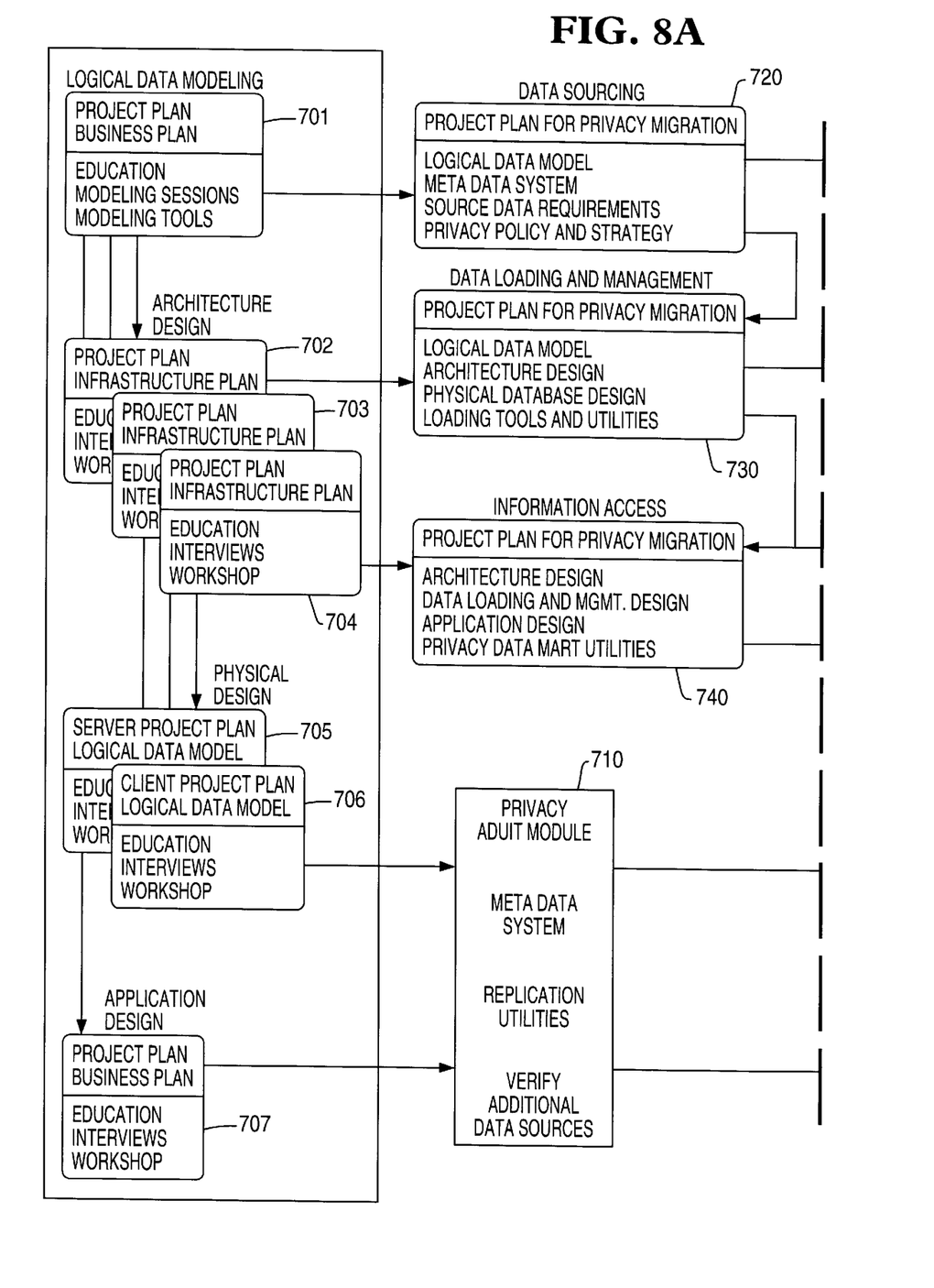
FIGS. 8A and 8B provide a graphical representation of the migration methodology that supports the implementation of the consumer access dependent data mart.
Figure 8B:
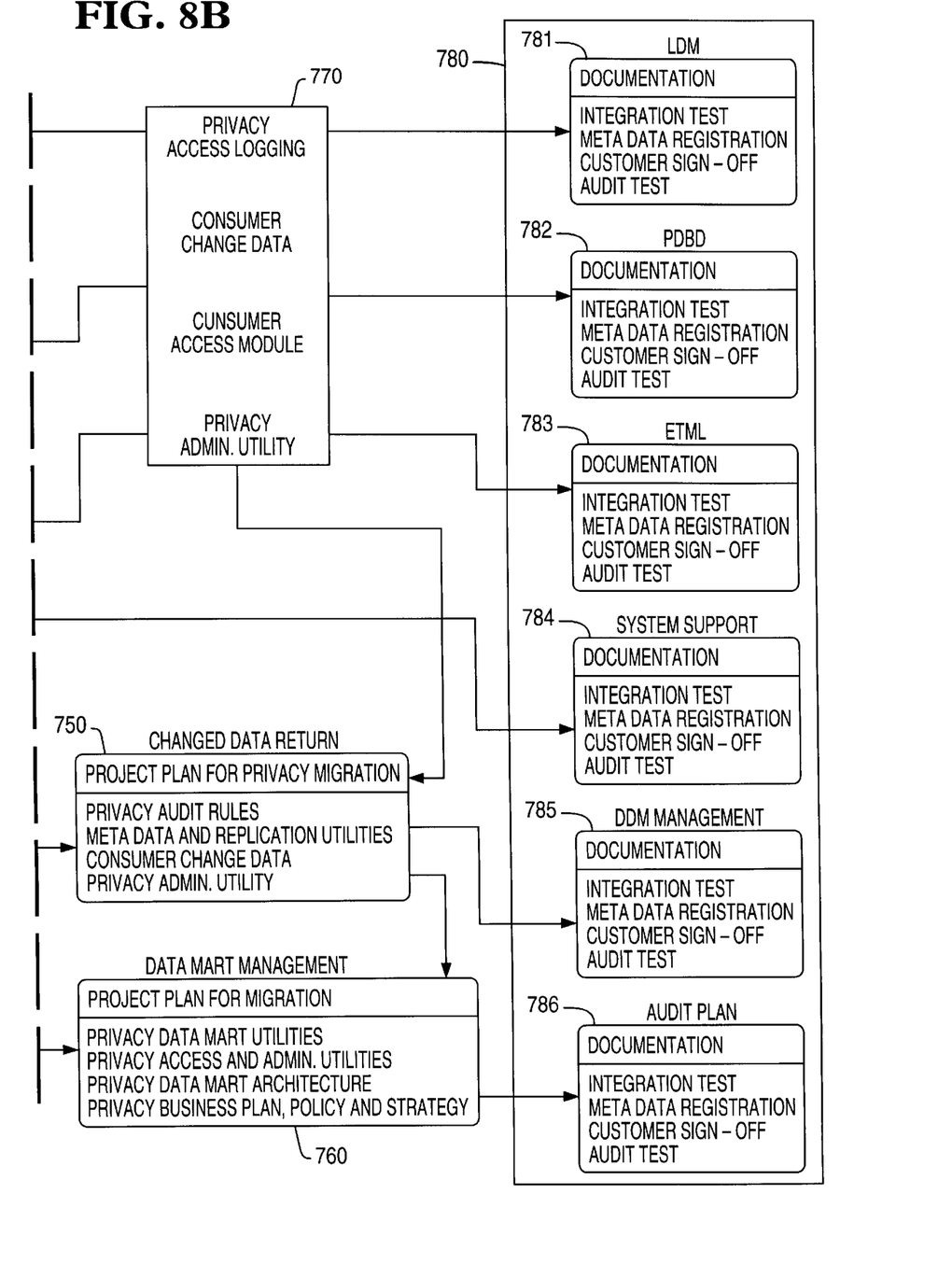

FIG. 8 is a flow chart illustrating the specific methodology for building the Consumer Access Dependent Data Mart and migrating consumer data and it's accompanying profile for privacy preferences from a data warehouse and other data sources to the data mart.

Project Management—Project Management is critical to the success of Dependent Data Mart Migration to meet obligations to the customer and for the elimination of 'scope creep', a project plan is required for all implementations. A Project Plan governs the Design Phase 700 with Logical Data Modeling 701, Architecture Design 702 (Source data), 703 (Target Data) and 704 (Data Mart), Physical Design 705 (Business Profile) and 706 (Consumer Profile) and Application Design 707. Each step in the Design Phase contains Education, Interview and Workshop elements that accompany the tasks necessary to complete the input into the next phase. Also, Logical Data Modeling 701 feeds information into Architecture Design 702, Physical Design 703 and Application Design 704.

Project Management also passes the plan from the Design steps to the Implementation services for Data Sourcing 720, Data Loading and Management 730, Information Access 740, Changed Data Return 750 and Data Mart Management 760. The NCR project management methodology is the single point of contact with the customer. Project managers are responsible for all aspects of the Dependent Data Mart program.

Logical Data Modeling—This service produces the attributed logical data model and/or star schema for the initial implementation of the Dependent Data Mart. Activities in this service include confirmation of requirements and generation of the data model showing relationships and attributes. The data model is crucial to a Dependent Data Mart solution to ensure that the proper business focus and flexibility are maintained in the solution. The data model is not specific to a platform or database and is separate from any physical dependencies. The data model for the Dependent Data Mart may be either a logical data model derived from the enterprise data warehouse, or a star schema data model.

Architecture Design—This service produces the infrastructure for the initial implementation of the Dependent Data Mart. Activities in this service include confirmation of requirements and generation of the source systems that feed the Dependent Data Mart, the Dependent Data Mart itself and the architecture for the return of changed data back to the data warehouse. The architecture model is crucial to a Dependent Data Mart solution to ensure that the proper technical focus and flexibility are maintained in the solution. The architecture model is specific to a platform and database and is based on its physical dependencies.

Physical Database Design—This service provides the client a physical database design optimized for dependent data mart. The primary activities of this service are: translating the data model to a physical database design, database construction, design optimization, and functional testing of the constructed database.

Application Design (Query Development)—This service provides the design and implementation of the query interface for the Dependent Data Mart Solution. Utilizing a GUI based tool, queries to answers of agreed upon business questions will be developed as part of the Dependent Data Mart Program. The Application Design service develops applications that enable review and input for change based on access to detail consumer data, data summaries, and staged queries.

Data Transformation and Replication—This service designs the process and develops the utilities and programming that allow the dependent data mart database to be initially loaded and maintained. The service locates, transforms, replications, transports, and loads data onto the target platform. Included is the operational planning that allows the reloading or incremental loading of the dependent data mart on a periodic basis. Data transformation and replication for the Dependent Data Mart Program will normally be executed using Teradata utilities.

Data Mart Management—This service encompasses the backup, archive, restore, and recovery strategy for the dependent data mart. This service does not include taking the dependent data mart into production, this is the responsibility of the Customer.

Documentation—This service encompasses the Integration Test, Meta Data Registration, Audit Testing and Customer sign-off. Customer Education is key to any data warehouse or dependent data mart success and is included as part of the dependent data mart services program. Other, standard Data Warehouse Implementation services elements are:

Logical Data Model
Physical Data Base Design
Extract, Transfer, Move and Load scripts
System Management Integration
Audit and Control Plan There are many types and uses of metadata including: Business rules and definitions, Directory of warehouse users, developers, users, etc., Database schema's and views, Transformational mappings, Source database logical models, Target warehouse models including data marts, Refresh frequency of data, Security, Reports, Performance metrics, and Computing system components. Thus, the content of metadata is evolved during Privacy Implementation from merely a logical model of the source and target databases to full integration with business rules to information about information system resources.

The foregoing description of the various embodiments of the invention has been presented for the purposes of illustration and description. It is not intended to be exhaustive or to limit the invention to the precise form disclosed. Many alternatives, modifications, and variations will be apparent to those skilled in the art of the above teaching. Accordingly, this invention is intended to embrace all alternatives, modifications, and variations that have been discussed herein, and others that fall within the spirit and broad scope of the claims.

What is claimed is:

1. A data warehousing, management, and privacy control system, comprising:

a database management system, for storing and retrieving customer data;

a privacy metadata system that administers and records all customer personal data, users of said customer personal data, and usage of said customer personal data;

a replication system providing communication between said database management system and said privacy metadata system; and a database management system interface operatively coupled to the database management system and controlling access to said customer data and to said customer personal data through said replication system.

2. The data warehousing, management, and privacy control system according to claim 1, wherein:

said replication system provides customer personal data from said database management system interface to said privacy metadata system.

3. The data warehousing, management, and privacy control system according to claim 1, further comprising:

a customer access module operatively coupled to the privacy metadata system and providing a customer with means to access data, correct data and change of preferences to customer personal data related to said customer.

4. The data warehousing, management, and privacy control system according to claim 1, wherein:

said replication system provides changes and corrections to said customer data from said privacy metadata system to said database management system.

5. The data warehousing, management, and privacy control system according to claim 1, wherein:

said database management system interface provides access to said customer data and to said customer personal data in accordance with privacy parameters stored in said database management system.

6. The data warehousing, management, and privacy control system according to claim 1, further comprising:

a privacy access logging system that captures and records all access attempts to said customer personal data.

* * * * *